(12) United States Patent
Park et al.

(10) Patent No.: US 10,666,908 B2
(45) Date of Patent: May 26, 2020

(54) CAMERA MODULE FOR VEHICLE AND MONITORING SYSTEM PROVIDED WITH THE SAME

(71) Applicant: HYUNDAI AUTRON CO., LTD., Seongnam-si (KR)

(72) Inventors: Man-Su Park, Anyang-si (KR); Jae-Woo Joung, Yongin-si (KR); Hyung-Suk Oh, Yongin-si (KR); Yun-Kang Hur, Seongnam-si (KR); Byung-Jik Keum, Seoul (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 238 days.

(21) Appl. No.: 14/109,870

(22) Filed: Dec. 17, 2013

(65) Prior Publication Data
US 2014/0168438 A1 Jun. 19, 2014

(30) Foreign Application Priority Data
Dec. 18, 2012 (KR) .......................... 10-2012-0148755

(51) Int. Cl.
*H04N 5/225* (2006.01)
*H04N 7/18* (2006.01)
*B60R 11/04* (2006.01)
*B60R 1/12* (2006.01)

(52) U.S. Cl.
CPC ............... *H04N 7/183* (2013.01); *B60R 1/12* (2013.01); *B60R 11/04* (2013.01); *B60R 2001/1253* (2013.01)

(58) Field of Classification Search
CPC ......... G03B 17/14; G03B 19/07; H04N 5/222
USPC ........................................................... 348/148
See application file for complete search history.

(56) References Cited

U.S. PATENT DOCUMENTS

| 6,286,967 B1* | 9/2001 | Cainion ................. B60R 1/085 359/871 |
| 6,535,242 B1* | 3/2003 | Strumolo ................ B60R 11/04 348/148 |
| 7,764,320 B1* | 7/2010 | Salvato ............. G06K 7/10881 348/344 |

(Continued)

FOREIGN PATENT DOCUMENTS

| EP | 1 264 734 A2 | 12/2002 |
| EP | 1 560 423 A1 | 8/2005 |

(Continued)

*Primary Examiner* — Jamie J Atala
*Assistant Examiner* — Patrick E Demosky
(74) *Attorney, Agent, or Firm* — Morgan, Lewis & Bockius LLP

(57) ABSTRACT

Disclosed herein are a camera module for a vehicle and a monitoring system provided with the same capable of conveniently identifying circumstances around a vehicle by photographing the circumference of the vehicle in various directions.

According to an exemplary embodiment of the present invention, the camera module includes a camera module including a plurality of lenses which is mounted in different directions to form each image, one image sensor unit which is mounted to be movable to corresponding positions of each image formed by the plurality of lenses, a guide part which selectively moves the image sensor unit, and an image processor which processes an image signal output from the image sensor unit.

12 Claims, 5 Drawing Sheets

(56) References Cited

U.S. PATENT DOCUMENTS

| | | | | |
|---|---|---|---|---|
| 8,294,808 B2* | 10/2012 | Caron | ................... | G02B 23/12 |
| | | | | 348/344 |
| 2002/0181034 A1* | 12/2002 | Miyake | ............... | H04N 5/2254 |
| | | | | 358/514 |
| 2005/0253951 A1* | 11/2005 | Fujimoto | ............ | H04N 5/2253 |
| | | | | 348/335 |
| 2009/0284599 A1* | 11/2009 | Wagner | ................... | B60R 1/00 |
| | | | | 348/148 |
| 2010/0066518 A1* | 3/2010 | Ohshima | ................. | B60R 1/00 |
| | | | | 340/435 |
| 2010/0097442 A1 | 4/2010 | Lablans | | |
| 2010/0194889 A1 | 8/2010 | Arndt et al. | | |
| 2010/0239238 A1* | 9/2010 | Chen | ...................... | G02B 7/023 |
| | | | | 396/73 |
| 2013/0002876 A1* | 1/2013 | Pastrick | ............... | B60Q 1/2665 |
| | | | | 348/148 |
| 2015/0181089 A1* | 6/2015 | Mirlay | .............. | G02B 27/1066 |
| | | | | 348/46 |

FOREIGN PATENT DOCUMENTS

| | | | |
|---|---|---|---|
| EP | 2 163 430 A1 | | 3/2010 |
| JP | 2003-169233 A | | 6/2003 |
| JP | 2003169233 A | * | 6/2003 |
| JP | 2003169233 A | * | 6/2003 |
| JP | 2005-215160 A | | 8/2005 |
| JP | 2005-215160 A | * | 11/2005 |

* cited by examiner

CAMERA MODULE FOR VEHICLE AND MONITORING SYSTEM PROVIDED WITH THE SAME

CROSS REFERENCE TO RELATED APPLICATION

This application claims the benefit of Korean Patent Application No. 10-2012-0148755, filed on Dec. 18, 2012, which is hereby incorporated by reference in its entirety into this application.

BACKGROUND OF THE INVENTION

Technical Field

The present invention relates to a camera module for a vehicle and a monitoring system provided with the same, and more particularly, to a camera module for a vehicle and a monitoring system provided with the same capable of conveniently identifying circumstances around a vehicle by photographing the circumference of the vehicle in various directions.

Description of the Related Art

Generally, there is a need to pay attention to other vehicles positioned at the front, rear, sides, and the like, of a vehicle or obstacles for careful driving of the vehicle.

Recently, a system for monitoring the surrounding environment of a vehicle by photographing the surrounding environment of the vehicle using cameras each attached to the front, rear, left, and right of the vehicle and a system for detecting a blind spot have been proposed.

However, since a viewing angle of a camera module which is used in the system for monitoring the surrounding environment of a vehicle and a viewing angle of a camera module which is used in the system for detecting a blind spot are different from each other, there is a need to use the camera module capable of securing different viewing angles for each system.

Further, there is a limitation in providing a system conforming to circumstances to a driver due to a problem of a vehicle structure in which several cameras may not be mounted at the front, rear, and sides of the vehicle.

SUMMARY OF THE INVENTION

The present invention has been made in an effort to provide a camera module for a vehicle and a monitoring system provided with the same capable of conveniently identifying circumstances around a vehicle by photographing the circumference of the vehicle in various directions.

Further, the present invention has been made in an effort to provide a camera module for a vehicle and a monitoring system provided with the same which may be manufactured at low cost by combining a plurality of lenses having different viewing angles with one image sensor unit.

According to an exemplary embodiment of the present invention, there is provided a camera module, including: a plurality of lenses mounted in different directions to form each image; one image sensor unit mounted to be movable to corresponding positions of each image formed by the plurality of lenses; a guide part selectively moving the image sensor unit; a case in which the guide part is included; and an image processor processing an image signal output from the image sensor unit.

The guide part may include: a guide rail included in the case; and an actuator included in the case to selectively move the image sensor unit along the guide rail.

The actuator may include: a fitting guard coupled with the image sensor unit; and a solenoid moving the fitting guard.

The actuator may include a motor moving the image sensor unit.

The guide part may further include a guide roller coupled with the image sensor unit to move the image sensor unit along the guide rail.

The case may be a side mirror case which is mounted on a side of a vehicle.

According to another exemplary embodiment of the present invention, there is provided a monitoring system, including: a camera module including a plurality of lenses which is mounted in different directions to form each image, one image sensor unit which is mounted to be movable to corresponding positions of each image formed by the plurality of lenses, a guide part which selectively moves the image sensor unit, and an image processor which processes an image signal output from the image sensor unit; a monitor receiving a signal from the image processor and outputting the received signal; and a switch outputting an actuation signal to the guide part.

The guide part may include: a guide rail included in the case; and an actuator included in the case to selectively move the image sensor unit along the guide rail.

The actuator may include: a fitting guard coupled with the image sensor unit; and a solenoid moving the fitting guard.

The actuator may include a motor moving the image sensor unit.

The guide part may further include a guide roller coupled with the image sensor unit to move the image sensor unit along the guide rail.

The case may be a side mirror case which is mounted on a side of a vehicle.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
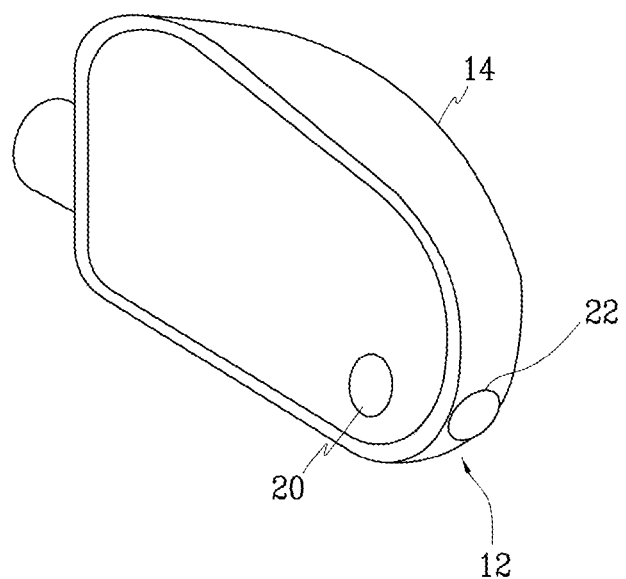
FIG. 1 is a perspective view illustrating a camera module according to an exemplary embodiment of the present invention.

Hereinafter, exemplary embodiments of the present invention will be described in detail with reference to the accompanying drawings so that those skilled in the art may easily practice the present invention.

However, the present invention may be modified in various different ways and is not limited to the embodiments provided in the present description.

A part irrelevant to the description will be omitted to clearly describe the present invention, and the same elements will be designated by the same reference numerals throughout the specification.

Further, each component illustrated in the drawings is arbitrarily represented for convenience of explanation, and therefore the present invention is not necessarily limited to ones illustrated in the drawings.

A size and a thickness of each component illustrated in the drawings are arbitrarily represented for convenience of explanation, and therefore the present invention is not necessarily limited to ones illustrated in the drawings and the thickness thereof are enlarged to clearly represent several parts and regions.

In the following description, the same components are classified into first, second, and the like to differentiate names for components and a sequence thereof is not necessarily limited thereto.

It will be understood that when an element such as a layer, film, region, or substrate is referred to as being "on" another element, it can be directly on the other element or intervening elements may also be present.

In contrast, when an element is referred to as being "directly on" another element, there are no intervening elements present.

Throughout the present specification, unless explicitly described to the contrary, "comprising" any components will be understood to imply the inclusion of other elements rather than the exclusion of any other elements.

Hereinafter, exemplary embodiments of the present invention will be described in detail with reference to the accompanying drawings.

Figure 2:
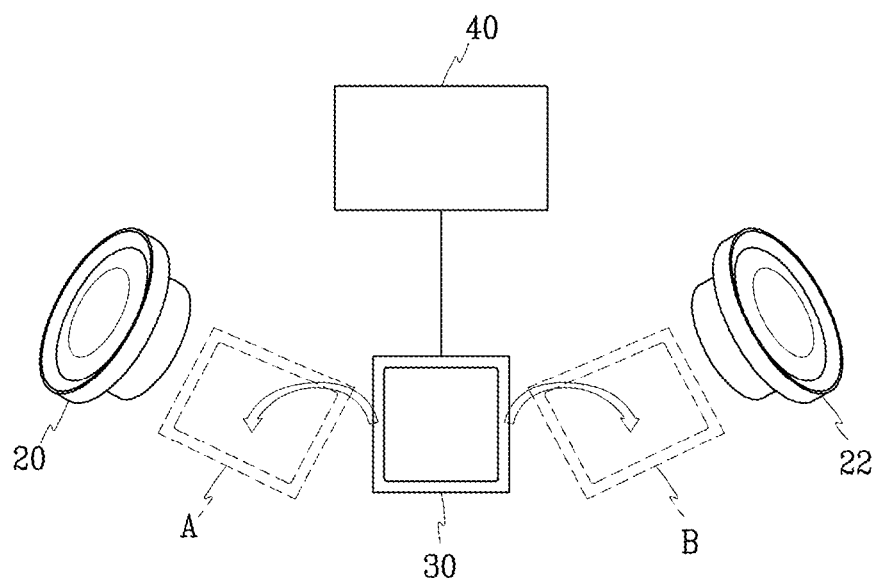
FIG. 2 is a conceptual view illustrating the camera module according to the exemplary embodiment of the present invention.
Figure 3:
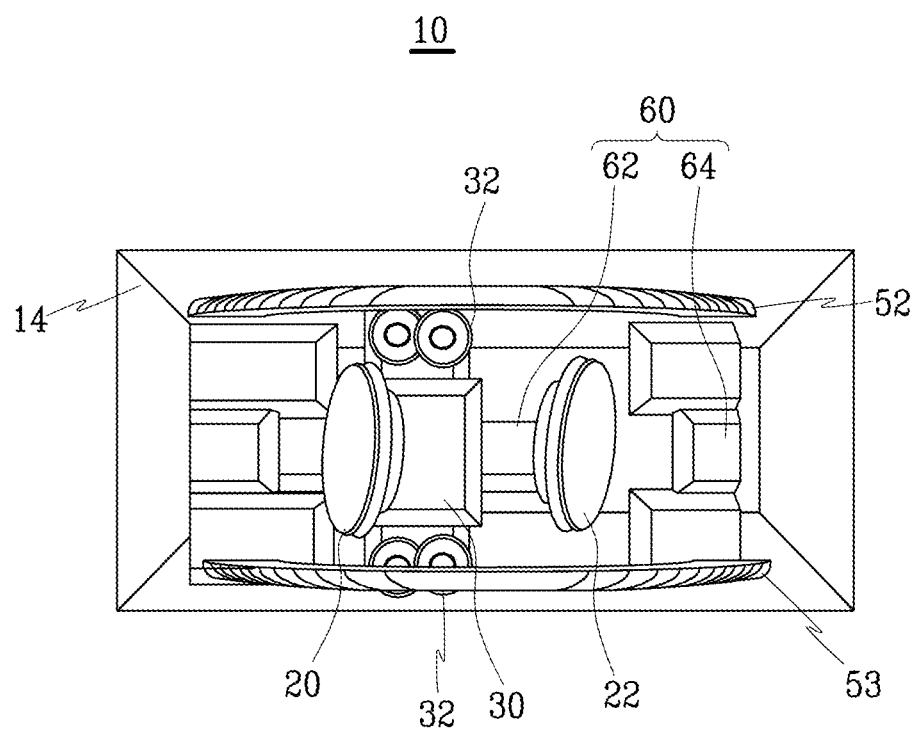
FIG. 3 is a partial cutaway view illustrating the camera module according to the exemplary embodiment of the present invention.

FIG. 1 is a perspective view illustrating a camera module according to an exemplary embodiment of the present invention, FIG. 2 is a conceptual view illustrating the camera module according to the exemplary embodiment of the present invention, and FIG. 3 is a partial cutaway view illustrating the camera module according to the exemplary embodiment of the present invention.

Referring to FIG. 1, a camera module 10 according to an exemplary embodiment of the present invention is mounted to secure a field of view around a vehicle at which a driver's view does not arrive. As illustrated in FIG. 1, the camera module 10 may be mounted on a side mirror 12 of a vehicle but is not necessarily mounted thereon, and therefore may be mounted on a side body or a door of a vehicle. In describing the camera module 10 according to the exemplary embodiment of the present invention, for convenience of explanation, the case in which the camera module 10 is mounted on the side mirror 12 of the vehicle will be described by way of example.

The camera module 10 according to the exemplary embodiment of the present invention includes a plurality of lenses which are provided in different directions to form each image.

As illustrated in FIG. 1, the plurality of lenses include a first lens 20 and a second lens 22, in which the first lens may be mounted toward a blind spot in the rear of the vehicle and the second lens 22 may be mounted toward blind spots in the sides of the vehicle but is not limited thereto, and therefore at least three lenses may be mounted, in which each lens may be mounted to form different angles of view even thought each lens is mounted in different directions or the same direction.

Referring to FIGS. 1 to 3, the camera module 10 according to the exemplary embodiment of the present invention includes one image sensor unit 30 which is mounted to move each image formed by the plurality of lenses, that is, the first lens 20 and the second lens 22 to the corresponding positions, a guide part which selectively moves the image sensor unit 30, a case in which the guide part is included, and an image processor 40 which processes an image signal output from the image sensor unit 30. Here, when the camera module 10 according to the exemplary embodiment of the present invention is mounted on the side mirror 12 of the vehicle, the case may be side mirror cases 14 which are mounted at sides of the vehicle as described above.

As illustrated in FIG. 2, the image sensor unit 30 of the camera module 10 according to the exemplary embodiment of the present invention may move to positions corresponding to each image formed by the first lens 20 and the second lens 22, that is, positions A and B. As the image sensor unit 30 moves to the positions A and B, the one image sensor unit 30 detects information around the vehicle which is selected by the driver through each of the first lens 20 and the second lens 22, converts the detected information into an electrical image signal, and transmits the corresponding image signal to the image processor 40.

Referring to FIG. 3, the guide part of the camera module 10 according to the exemplary embodiment of the present invention may include guide rails 52 and 53 which are included in the case 14 and an actuator 60 which is included in the case 14 to selectively move the image sensor unit 30 along the guide rails 52 and 53.

The guide rails 52 and 53 may be two as illustrated in FIG. 3 but is not limited thereto, and therefore one or at least three rails may be mounted to guide the image sensor unit 30.

The actuator 60 may include a fitting guard 62 which is coupled with the image sensor unit 30 and a solenoid 64 which moves the fitting guard 62.

The solenoid 64 moves the fitting guard 62 depending on an actuation signal of a switch 80 to be described below in more detail to be able to move the image sensor unit 30 to the positions corresponding to each image of the first lens 20 and the second lens 22.

The guide part 60 may be further provided with a guide roller 32 which is coupled with the image sensor unit 30 to move the image sensor unit 30 along the guide rails 52 and 53.

The guide roller 32 guides the image sensor unit 30 along the guide rails 52 and 53, and as illustrated in FIG. 3, may be provided in plural and one guide roller may be provided.

Figure 4:
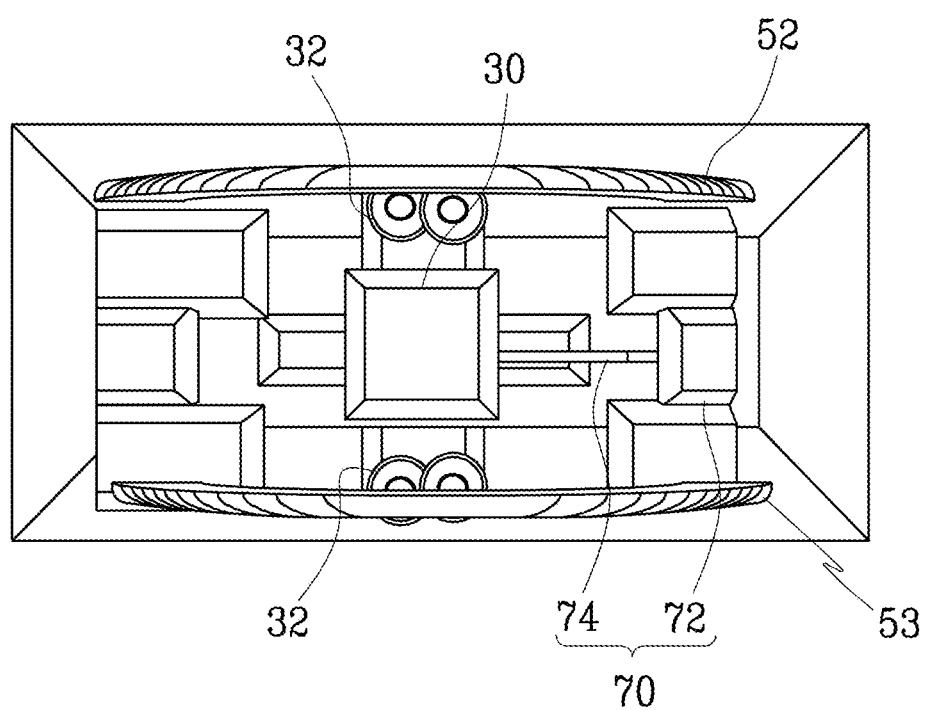
FIG. 4 is a partial cutaway view illustrating a modified example of the camera module according to the exemplary embodiment of the present invention.

FIG. 4 is a partial cutaway view illustrating a modified example of the camera module according to the exemplary embodiment of the present invention.

A modified example of the camera module according to the exemplary embodiment of the present invention illustrated in FIG. 4 has the same configuration and function as the camera module 10 according to the exemplary embodiment of the present invention illustrated in FIG. 3, except for the configuration of the actuator, and therefore the overlapping description of the same configuration and function will be omitted.

Referring to FIG. 4, according to the modified example of the camera module according to the exemplary embodiment of the present invention, an actuator 70 may include a motor 72 which moves the image sensor unit 30, in which the motor 72 selectively rotates a motor rod 74 to be able to move the image sensor unit 30.

Figure 5:
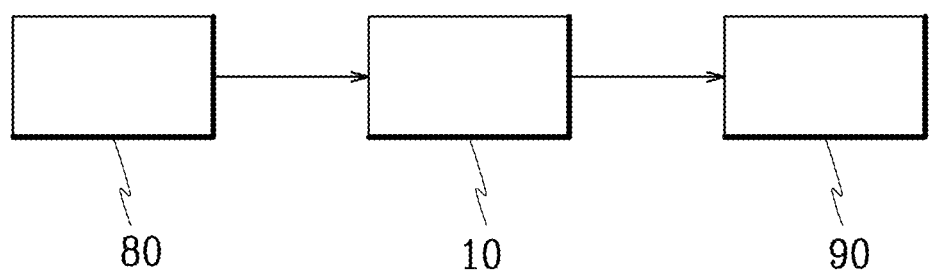
FIG. 5 is a block diagram illustrating a monitoring system according to an exemplary embodiment of the present invention.

FIG. 5 is a block diagram illustrating a monitoring system according to an exemplary embodiment of the present invention.

Referring to FIG. 5, the monitoring system according to the exemplary embodiment of the present invention may include the camera module 10 described above, a monitor 90 which receives the signal of the image processor 30 and outputs the received signal, and the switch 80 which outputs the actuation signal to the guide part.

The driver uses the switch 80 to be able to select a field of view to be monitored and the actuators 60 and 70 move the image sensor unit 30 to the corresponding position so that the switch 80 secures the selected field of view. Next, the image sensor unit 30 detects the corresponding vision information, converts the detected information into the electrical image signal, and transmits the corresponding signal to the image processor 40. When the image processor 40 converts the corresponding image signal into a signal to be output from the monitor 90 and outputs the converted signal to the monitor 90, the driver may identify the corresponding image through the monitor 90.

The switch 80 may be a signal generation apparatus, such as a button and a dial and the monitor 90 may be a touch screen and may serve as the switch outputting the corresponding signal.

As described above, according to the exemplary embodiments of the present invention, the camera module for a vehicle and the monitoring system provided with the same may conveniently identify the circumstances around the vehicle by photographing the circumference of the vehicle in various directions.

Further, according to the exemplary embodiments of the present invention, the camera module for a vehicle and the monitoring system provided with the same may be manufactured at low cost by combining the plurality of lenses having different viewing angles with the one image sensor unit.

In addition, according to the exemplary embodiments of the present invention, the camera module for a vehicle and the monitoring system provided with the same may rapidly respond to the driver demands by moving only the image sensor unit so as to secure the driver's vision in other directions.

Although the exemplary embodiments of the present invention are described above, the present invention is not limited to the above-mentioned exemplary embodiments, but includes all changes which are in a range recognized to be equivalent by being easily changed by a person having ordinary skill in the art to which this invention pertains from the exemplary embodiments of the present invention.

What is claimed is:

1. A camera module, comprising: a first lens fixedly mounted on a front of a side mirror which is mounted on a side of a vehicle and a second lens fixedly mounted on a side of the side mirror, wherein the first and second lenses are mounted in different optical axes to form two images wherein each image of the two images is from a different angle of view;
   a single image sensor unit to be movable along predetermined paths to each corresponding position of an image formed by the first and second lenses, respectively, wherein the single image sensor unit detects information around the vehicle through either the first lens or the second lens and converts the detected information into an electrical image signal;
   a guide for selectively moving the single image sensor unit along the predetermined paths to each corresponding position;
   a side mirror case in which the guide is included;
   an image processor processing the image signal output from the single image sensor unit;
   a monitor receiving a signal from the image processor and outputting the received signal; and
   a switch outputting an actuation signal to the guide,
   wherein the first lens is fixedly mounted toward a blind spot in a rear of the vehicle and the second lens is fixedly mounted toward a blind spot in a lateral side of the vehicle, wherein the guide includes:
   a guide rail included in the side mirror case to connect between a first position and a second position corresponding to each image formed by the first lens and the second lens, respectively, wherein the guide rail has a circular arc path to form the predetermined paths of the single image sensor unit;
   an actuator included in the side mirror case to selectively move the single image sensor unit along the circular arc path of the guide rail to the first position and the second position corresponding to each image formed by the first lens and the second lens, respectively; and
   a guide roller with wheel shape coupled with the single image sensor unit to guide the single image sensor unit along the circular arc path of the guide rail,
   wherein a normal of the circular arc path along which the single image sensor unit moves coincides with the optical axis of the first lens when the single image sensor unit moves to the first position, and
   wherein the normal of the circular arc path along which the single image sensor unit moves coincides with the optical axis of the second lens when the single image sensor unit moves to the second position.

2. The camera module of claim 1, wherein the actuator includes:
   a solenoid; and
   a fitting guard coupled with the single image sensor unit and the solenoid, and moved by the solenoid.

3. The camera module of claim 1, wherein the actuator includes a motor moving the single image sensor unit.

4. A monitoring system, comprising:
   a camera module fixed to a vehicle and including a first lens fixedly mounted on a front of a side mirror which is mounted on a side of the vehicle and a second lens fixedly mounted on a side of the side mirror, wherein the first and second lenses are mounted in different optical axes to form two images, wherein each image of the two images is from a different angle of view;
   a single image sensor unit mounted to be movable along predetermined paths to each corresponding position of an image formed by the first and second lenses, respectively, wherein the single image sensor unit detects information around the vehicle through either the first lens or the second lens and converts the detected information into an electrical image signal;
   a guide for selectively moving the single image sensor unit along the predetermined paths to each corresponding position;
   a side mirror case in which the guide is included and an image processor which processes the image signal output from the single image sensor unit;
   a monitor receiving a signal from the image processor and outputting the received signal; and
   a switch outputting an actuation signal to the guide,
   wherein the first lens is fixedly mounted toward a blind spot in a rear of the vehicle and the second lens is fixedly mounted toward a blind spot in a lateral side of the vehicle, and wherein the guide includes:
   a guide rail included in the side mirror case to connect between a first position and a second position corresponding to each image formed by the first lens and the second lens, respectively, wherein the guide rail has a circular arc path to form the predetermined paths of the single image sensor unit:

an actuator included in the side mirror case to selectively move the single image sensor unit along the circular arc path of the guide rail to the first position and the second position corresponding to each image formed by the first lens and the second lens, respectively; and a guide roller with wheel shape coupled with the single image sensor unit to guide the single image sensor unit along the circular arc path of the guide rail, wherein a normal of the circular arc path along which the single image sensor unit moves coincides with the optical axis of the first lens when the single image sensor unit moves to the first position, and wherein the normal of the circular arc path along which the single image sensor unit moves coincides with the optical axis of the second lens when the single image sensor unit moves to the second position.

5. The monitoring system of claim 4, wherein the actuator includes:

a solenoid; and a fitting guard coupled with the single image sensor unit and the solenoid, and moved by the solenoid.

6. The monitoring system of claim 4, wherein the actuator includes a motor moving the single image sensor unit.

7. The monitoring system of claim 1, wherein the guide rail includes an upper guide rail and a lower guide rail, wherein the single image sensor unit and the actuator are positioned between the upper guide rail and the lower guide rail, and wherein the single image sensor unit slidably engaged to the upper guide rail and the lower guide rail.

8. The monitoring system of claim 4, wherein the guide rail includes an upper guide rail and a lower guide rail, wherein the single image sensor unit and the actuator are positioned between the upper guide rail and the lower guide rail, and wherein the single image sensor unit is slidably engaged to the upper guide rail and the lower guide rail.

9. The monitoring system of claim 1, wherein the actuator selectively rotates the single image sensor unit along the guide rail to the first position and the second position.

10. The monitoring system of claim 4, wherein the actuator selectively rotates the single image sensor unit along the guide rail to the first position and the second position.

11. The monitoring system of claim 1, wherein the single image sensor unit is configured to directly face the optical axis of the first lens when the single image sensor unit moves to the first position, and wherein the single image sensor unit is configured to directly face the optical axis of the second lens when the single image sensor unit moves to the second position.

12. The monitoring system of claim 4, wherein the single image sensor unit is configured to directly face the optical axis of the first lens when the single image sensor unit moves to the first position, and wherein the single image sensor unit is configured to directly face the optical axis of the second lens when the single image sensor unit moves to the second position.

* * * * *